(12) United States Patent
Uprit et al.

(10) Patent No.: US 12,079,870 B2
(45) Date of Patent: *Sep. 3, 2024

(54) SMART DECENTRALIZED PLATFORM FOR SETTLEMENT OF DELISTED STOCKS

(71) Applicant: Bank of America Corporation, Charlotte, NC (US)

(72) Inventors: Saurabh Uprit, Chennai (IN); Amar Tayade, Mumbai (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/101,205

(22) Filed: Jan. 25, 2023

(65) Prior Publication Data

US 2023/0169591 A1    Jun. 1, 2023

Related U.S. Application Data

(63) Continuation of application No. 17/502,359, filed on Oct. 15, 2021, now Pat. No. 11,615,469.

(51) Int. Cl.
*G06Q 40/00* (2023.01)
*G06Q 40/04* (2012.01)
(52) U.S. Cl.
CPC .................................. *G06Q 40/04* (2013.01)
(58) Field of Classification Search
None
See application file for complete search history.

(56) References Cited

U.S. PATENT DOCUMENTS

| | | | |
|---|---|---|---|
| 10,171,245 B2 | 1/2019 | Wilkins et al. | |
| 10,764,428 B2 | 9/2020 | Nitidharmatut et al. | |
| 10,904,382 B2 | 1/2021 | Nitidharmatut et al. | |
| 10,951,697 B2 * | 3/2021 | Brock | H04L 9/50 |
| 10,951,958 B1 | 3/2021 | Arana et al. | |

(Continued)

OTHER PUBLICATIONS

"HoloContract vs Smart Contract inside Holochain! I need a proof of concept" hedayat hApps Being Built https://forum.holochain.org/t/holocontract-vs-smart-contract-inside-holochain-i-need-a-proof-of-concept/2221, website visited Aug. 20, 2021, pp. 1-7.

(Continued)

*Primary Examiner* — Olabode Akintola
(74) *Attorney, Agent, or Firm* — Banner & Witcoff, Ltd.

(57) ABSTRACT

Aspects of the disclosure relate to computing hardware and software for analyzing and processing data associated with delisted stock trading. A computing platform may receive, from a client computing device, a request to provide recommended parameters for the sale of a first delisted stock, which may include a recommended time to sell and a sale price, and may identify, using a delisting recommendation engine, the recommended parameters. The computing platform may send, to the client computing device, the recommended parameters. The computing platform may receive a request to sell the first delisted stock under conditions of the recommended parameters and may cause execution of smart contract ledgering between a buyer and a seller to identify final sale parameters. Thereafter, the computing platform may cause execution of a transfer of the first delisted stock from the seller to the buyer and a transfer of funds from the buyer to the seller.

20 Claims, 10 Drawing Sheets (56) References Cited

U.S. PATENT DOCUMENTS

| | | |
|---|---|---|
| 11,032,423 B2 | 6/2021 | Nitidharmatut et al. |
| 11,144,540 B2 | 10/2021 | Yan |
| 11,144,568 B2 | 10/2021 | Todd |
| 11,144,618 B2 | 10/2021 | Liu |
| 11,144,645 B2 | 10/2021 | Herrin et al. |
| 11,144,660 B2 | 10/2021 | Latka et al. |
| 11,144,666 B2 | 10/2021 | Ahmed et al. |
| 11,144,893 B2 | 10/2021 | Li et al. |
| 11,144,978 B1 | 10/2021 | Stoyanov |
| 11,146,399 B2 | 10/2021 | Westland et al. |
| 11,146,403 B2 | 10/2021 | Ponnuru et al. |
| 11,146,405 B2 | 10/2021 | Yuan et al. |
| 11,146,555 B2 | 10/2021 | Pemmaraju |
| 11,146,682 B1 | 10/2021 | Jayapalan et al. |

OTHER PUBLICATIONS

David Atkinson "Preparing to build on Holochain" Getting Started and preparing for deep dive https://holo.host/wp-content/uploads/holochain-building.pdf, website visited Oct. 15, 2021, pp. 1-27.
Aug. 5, 2022—(US) Non-Final Office Action—U.S. Appl. No. 17/502,359.
Dec. 2, 20221 (US) Notice of Allowance U.S. Appl. No. 17/502,359.

\* cited by examiner

Parameter Recommendation Interface

Based on historical transaction records and current sell order entries, the optimal time to sell this stock is Time #1, Date X, and the optimal sale price is $$$.

Execution Confirmation Interface

The requested trade has been executed at the agreed upon price.

FIG. 5

FIG. 6

SMART DECENTRALIZED PLATFORM FOR SETTLEMENT OF DELISTED STOCKS

CROSS-REFERENCE TO RELATED APPLICATIONS

The present application is a continuation of U.S. application Ser. No. 17/502,359, filed Oct. 15, 2021, which is hereby incorporated by reference in its entirety.

BACKGROUND

Aspects of the disclosure relate to computing hardware and software, particularly distributed computing hardware and software for analyzing and processing data associated with delisted stock trading. When a stock is delisted, the shareholder may still own the shares and may choose to keep or sell the shares. Such trades, however, must occur on the over-the-counter market, and ownership rights may become worthless if the company declares bankruptcy. Liquidating such delisted stocks on the over-the-counter market may be cumbersome, and achieving the highest sale price may be difficult. For example, obtaining this highest price may require effective real time analysis of a number of variables. It is therefore important to identify a reliable method for such analysis. It is difficult to design and implement computer hardware and software to address these issues because of the large amount of data involved and the relatively short time windows in which such data would need to be processed in order to recommend and/or execute trading decisions that generate any value.

SUMMARY

Aspects of the disclosure provide effective, efficient, scalable, and convenient technical solutions that address and overcome the technical problems associated with developing and implementing computer hardware and software that analyzes and/or processes data associated with selling/trading delisted stocks. In accordance with one or more embodiments of the disclosure, a computing platform comprising at least one processor, a communication interface, and memory storing computer-readable instructions may train, based on historical data, a delisting recommendation engine, where training the delisting recommendation engine configures the delisting recommendation engine to output, based on the historical data, a recommended time to sell and a recommended sale price for one or more delisted stocks. The computing platform may receive, from a client computing device, a request to provide recommended parameters for the sale of a first delisted stock, where the recommended parameters include at least: the recommended time to sell and the recommended sale price. The computing platform may identify, using the delisting recommendation engine, the recommended parameters. The computing platform may send, to the client computing device, the recommended parameters identified using the delisting recommendation engine. The computing platform may receive a request to sell the first delisted stock under conditions of the recommended parameters identified using the delisting recommendation engine. The computing platform may send, to the client computing device and a recipient computing device, one or more commands that cause execution of smart contract ledgering between a buyer and a seller to identify final sale parameters, which may cause the client computing device and the recipient computing device to execute smart contract ledgering between the buyer and the seller to identify the final sale parameters. The computing platform may receive an indication that the smart contract ledgering is completed and that the final sale parameters have been identified. The computing platform may send, to a custodian computing device and the client computing device, one or more commands that cause execution of a transfer of the first delisted stock from the seller to the buyer and a transfer of funds from the buyer to the seller, which may cause execution of the transfer of the first delisted stock from the seller to the buyer and the transfer of the funds from the buyer to the seller.

In one or more instances, identifying the recommended parameters may include identifying, based on the historical data, a predicted time within a predetermined time window in which a predicted sale price of the first delisted stock is higher than at any other time during the predetermined time window. In one or more instances, the historical data may include one or more of: risk scoring information, pricing information, or time information.

In one or more instances, execution of the smart contract ledgering may include implementing one or more distributed ledger nodes, and each of the one or more distributed ledger nodes may be configured to maintain an independent distributed ledger for an entity associated with the corresponding distributed ledger node. In some instances, the one or more distributed ledger nodes may be holochain nodes (or similar distributed ledger technology (DLT).

In one or more instances, the holochain nodes may be: 1) configured in a decentralized manner, 2) configured to process entries in real time, and 3) configured to operate offline. In one or more instances, the holochain nodes may be configured using a subscription-based contract.

In one or more instances, execution of the smart contract ledgering may include executing a multi-signature contract between each of the holochain nodes. In one or more instances, additional holochain nodes may be added to the computing platform without affecting configuration of the holochain nodes.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction to the concepts described further herein, one or more aspects of the disclosure relate to using artificial intelligence to improve the process of settling delisted stocks. For example, when a stock gets delisted, the shareholder may still own the shares, and may choose to keep them or sell them. However, trading may have to occur on the over-the-counter market, and ownership rights may become worthless if the company declares bankruptcy (except for the case of positive outcome or profit given the effects of private buyout). In financial reality, the delisting of a company may be a negative event. For example, it may occur after a company goes bankrupt or as it approaches bankruptcy based on a decline in liquidity, a decline in volume, ownership problems, high costs or expenses, and/or other reasons. Liquidating or selling such delisted stocks on the over-the-counter market or via brokering houses may be cumbersome, and there might not be opportunities for timely alert/decision making or selling.

One or more aspects of the disclosure relate to a user interface and engine for delisted stock proceedings (a financial cloud onboarding delister custodian). One or more of the methods described herein may include a smart contract based method that covers both local and global delistings, and may be supported by an artificial intelligence engine that tracks market movement, timelines, and/or customer preferences to reap the best liquidation outcomes. This may contrast with other systems and off market over-the-counter/pink receipts involving global funds or listings, which might not be collaborative, coordinated, centralized, instant, and/or intelligent.

In some instances, a customer may be alerted on a trading terminal with a delisted stock alert apart from social communications or a ticker. The customer may then initiate an interest to sell off the delisted stock, with the conditions of the best liquid able cost, timeline, and/or urgency (which may be input via a questionnaire). An artificial intelligence engine may churn the best price offered, quantity, cost on trend, timeline of delisting, and/or other factors to predict sale conditions. The customer may then submit the sell request to a broker firm. The request may be received by an artificial intelligence engine for risk management and order entry and trading, which may be hosted on a finance cloud. There may then be smart contract ledgering between the broker custodian, the delisting agency, and the entity that was delisted. Real time review and approval may be provided by the involved parties to square off the sale, and confirmation of the delisting liquidation may be provided. Details of the delisting liquidation may also be sent to the custodian, which may relay the information to the broker for confirmation. Once confirmed at the broker, clearing may begin and settlement may be achieved.

These and other features are described in further detail below.

Figure 1A:
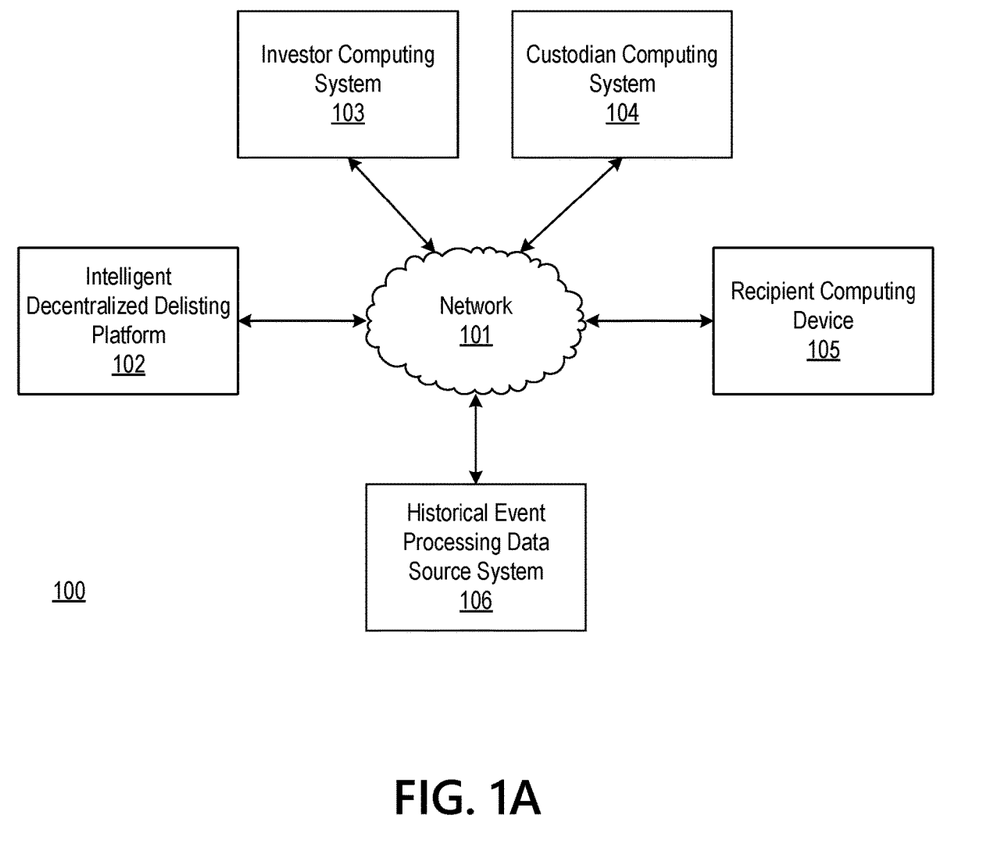
FIGS. 1A-1B depict an illustrative computing environment that uses Distributed ledger based network (like Holochain and other such or similar distributed ledger technology (DLT) networks) assisted by Artificial assistance to settle delisted stocks in accordance with one or more example embodiments.
Figure 1B:
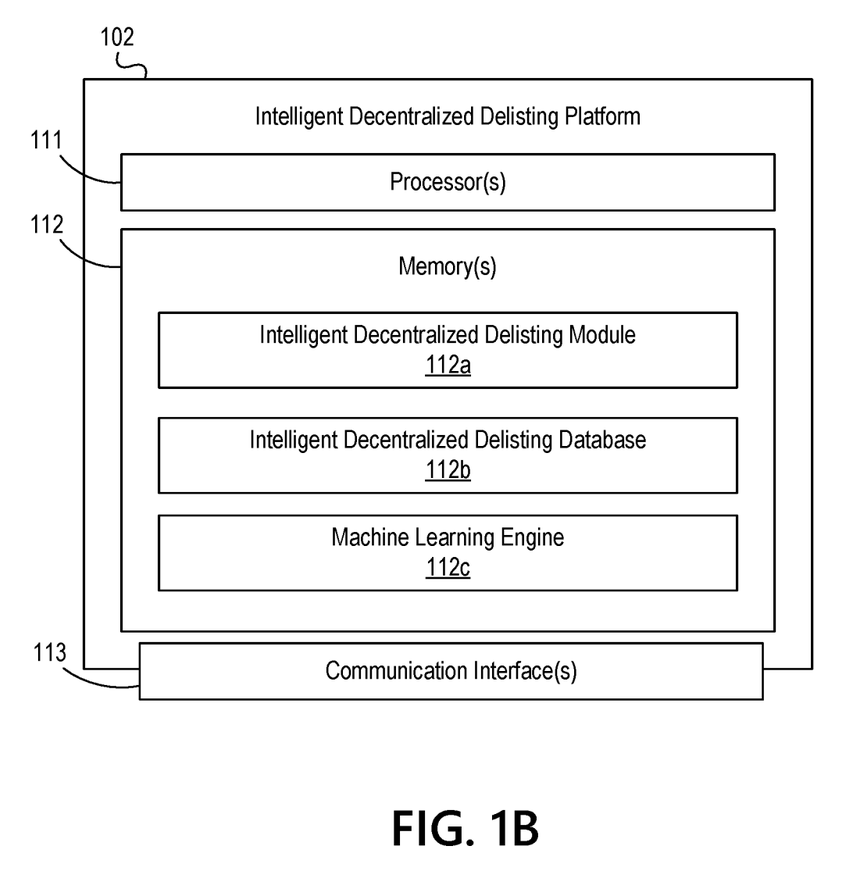

FIGS. 1A-1B depict an illustrative computing environment that uses artificial intelligence to settle delisted stocks in accordance with one or more example embodiments. Referring to FIG. 1A, computing environment 100 may include one or more computer systems. For example, computing environment 100 may include intelligent decentralized delisting platform 102, investor computing system 103, custodian computing system 104, recipient computing device 105, and historical event processing data source system 106.

Figure 6:
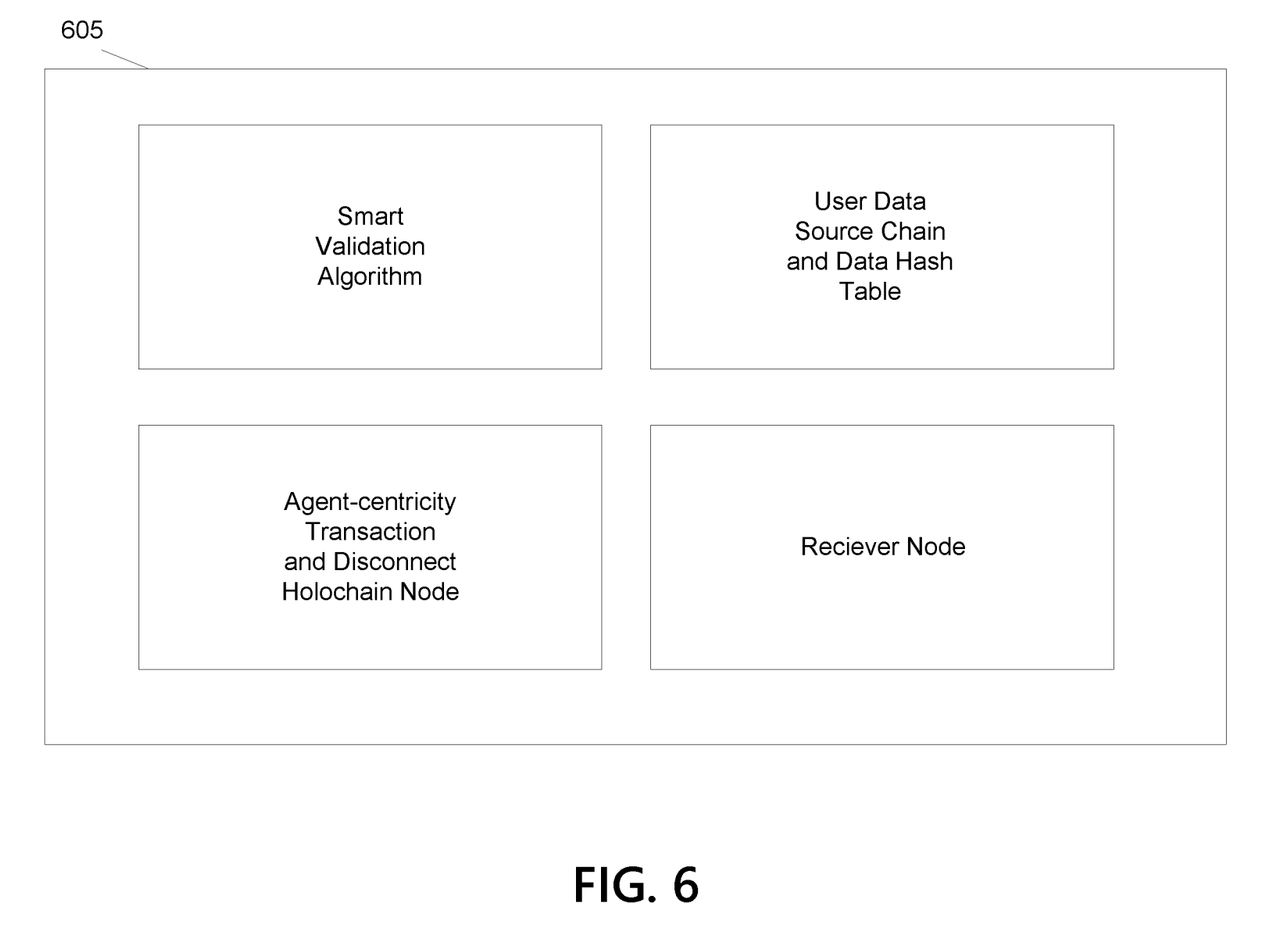
FIG. 6 depicts an illustrative node for a decentralized platform that be used for settlement of delisted stocks.

As described further below, intelligent decentralized delisting platform 102 may be a computer system that includes one or more computing devices (e.g., servers, server blades, or the like) and/or other computer components (e.g., processors, memories, communication interfaces) that may be used to train and maintain an artificial intelligence engine that may be used to provide recommendations on settlement times, prices, and/or other information for delisted stocks. In some instances, the intelligent decentralized delisting platform 102 may be configured with one or more holochain nodes (or similar distributed ledger or similar distributed ledger technology (DLT) networks) that may be used to facilitate smart contract ledgering between buyers and sellers. For example, these holochain nodes may be similar to node 605, which is illustrated in FIG. 6, and which may be a brokerage node, a delister node, a bank/custodian node, and/or other node.

Investor computing system 103 may be a laptop computer, desktop computer, mobile device, tablet, smartphone, server, and/or other device that may be used by an investor, broker, or other individual to request one or more actions (e.g., requesting processing of an event such as the sale of a delisted stock). In some instances, the investor computing system 103 may be configured to display one or more user interfaces (which may, e.g., enable a user to accept/reject settlement recommendations/offers, and/or perform other functions).

Custodian computing system 104 may be a laptop computer, desktop computer, mobile device, tablet, smartphone, server, server, and/or other device that may be used by an enterprise (such as a financial institution or other enterprise) to host or otherwise maintain assets that may be bought, sold, or otherwise exchanged. For example, the custodian computing system 104 may host a service that may maintain possession of an asset (such as a delisted stock) that is to be settled.

Recipient computing device 105 may be a laptop computer, desktop computer, mobile device, tablet, smartphone, wearable device, and/or other device that may be used by an individual (such as a potential purchaser of a delisted stock) to complete settlement of an asset. In some instances, recipient computing device 105 may be configured to display one or more user interfaces (e.g., which may include historical event processing information requested by the user, or the like).

Historical event processing data source system 106 may be one or more computer devices (servers, server blades, or the like), which may be configured to store historical data (e.g., historical transaction data such as sale prices, market trends, time information, sale quantities, and/or other information that may be used to predict sale prices). In some instances, the historical event processing data source system 106 may be configured to communicate with the intelligent decentralized delisting platform 102 to provide training data for the artificial intelligence engine hosted by the decentralized delisting platform 102.

Computing environment 100 also may include one or more networks, which may interconnect intelligent decentralized delisting platform 102, investor computing system 103, custodian computing system 104, recipient computing device 105, and/or historical event processing data source system 106. For example, computing environment 100 may include a network 101 (which may interconnect, e.g., intelligent decentralized delisting platform 102, investor computing system 103, custodian computing system 104, recipient computing device 105, and/or historical event processing data source system 106).

In one or more arrangements, intelligent decentralized delisting platform 102, investor computing system 103, custodian computing system 104, recipient computing device 105, and/or historical event processing data source system 106 may be any type of computing device capable of sending and/or receiving requests and processing the requests accordingly. For example, intelligent decentralized delisting platform 102, investor computing system 103, custodian computing system 104, recipient computing device 105, and/or historical event processing data source system 106 and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of intelligent decentralized delisting platform 102, investor computing system 103, custodian computing system 104, recipient computing device 105, and/or historical event processing data source system 106 may, in some instances, be special-purpose computing devices configured to perform specific functions.

Referring to FIG. 1B, intelligent decentralized delisting platform 102 may include one or more processors 111, memory 112, and communication interface 113. A data bus may interconnect processor 111, memory 112, and communication interface 113. Communication interface 113 may be a network interface configured to support communication between intelligent decentralized delisting platform 102 and one or more networks (e.g., network 101, or the like). Memory 112 may include one or more program modules having instructions that when executed by processor 111 cause intelligent decentralized delisting platform 102 to perform one or more functions described herein and/or one or more databases that may store and/or otherwise maintain information which may be used by such program modules and/or processor 111. In some instances, the one or more program modules and/or databases may be stored by and/or maintained in different memory units of intelligent decentralized delisting platform 102 and/or by different computing devices that may form and/or otherwise make up intelligent decentralized delisting platform 102. For example, memory 112 may have, host, store, and/or include intelligent decentralized delisting module 112a, intelligent decentralized delisting database 112b, and/or machine learning engine 112c.

Intelligent decentralized delisting module 112a may have instructions that direct and/or cause intelligent decentralized delisting platform 102 to train, implement, and/or otherwise maintain an artificial intelligence engine that may generate seller recommendations, as discussed in greater detail below. Intelligent decentralized delisting database 112b may store information used by intelligent decentralized delisting module 112a and/or intelligent decentralized delisting platform 102 in application of advanced techniques to generate seller recommendations, facilitate settlement, and/or in performing other functions. Machine learning engine 112c may be used to iteratively refine the intelligent decentralized delisting module 112a based on updated transaction data and/or user input.

Figure 2A:
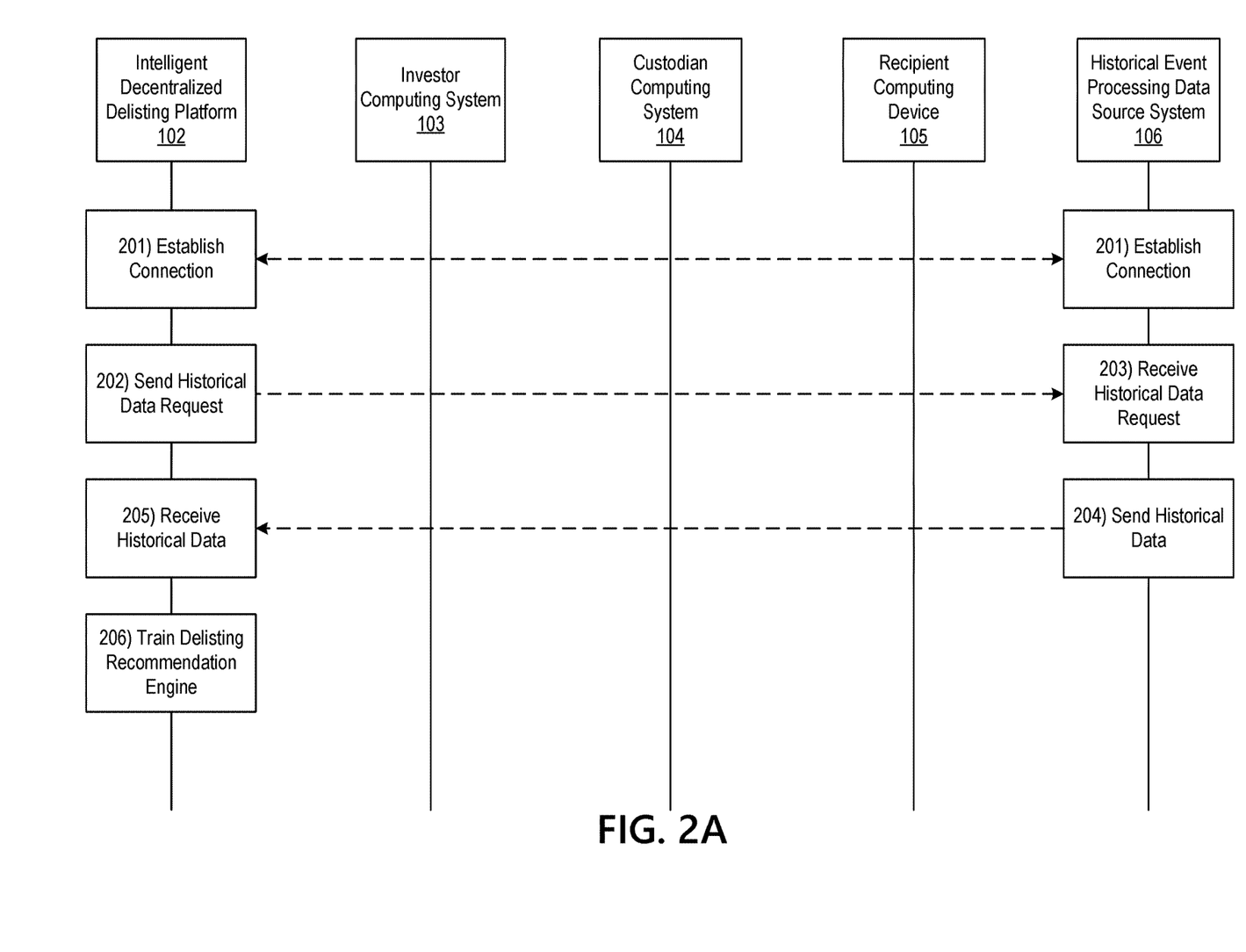
FIGS. 2A-2E depict an illustrative event sequence that uses Distributed ledger based network to settle delisted stocks in accordance with one or more example embodiments.

FIGS. 2A-2E depict an illustrative event sequence that uses a distributed ledger based network to settle delisted stocks in accordance with one or more example embodiments. Referring to FIG. 2A, at step 201, the intelligent decentralized delisting platform 102 may establish a connection with the historical event processing data source system 106. For example, the intelligent decentralized delisting platform 102 may establish a first wireless data connection with the historical event processing data source system 106 (e.g., in preparation for requesting historical data). In some instances, the intelligent decentralized delisting platform 102 may identify whether or not a connection is already established with the historical event processing data source system 106. If a connection is already established with the historical event processing data source system 106, the intelligent decentralized delisting platform 102 might not re-establish the connection. If a connection is not yet established with the historical event processing data source system 106, the intelligent decentralized delisting platform 102 may establish the first wireless data connection as described herein.

At step 202, the intelligent decentralized delisting platform 102 may send a historical data request to the historical event processing data source system 106. For example, the intelligent decentralized delisting platform 102 may send a request for historical transaction data (e.g., risk scoring information, pricing information, time information, and/or other information that may be used to information action recommendations) associated with one or more assets (e.g., delisted stocks and/or other assets). In some instances, the intelligent decentralized delisting platform 102 may send the historical data request to the historical event processing data source system 106 via the communication interface 113 and while the first wireless data connection is established.

At step 203, historical event processing data source system 106 may receive the historical data request sent at step 202. For example, historical event processing data source system 106 may receive the historical data request while the first wireless data connection is established.

At step 204, the historical event processing data source system 106 may send the historical data to the intelligent decentralized delisting platform 102. For example, the historical event processing data source system 106 may send the historical data to the intelligent decentralized delisting platform 102 while the first wireless data connection is established. In some instances, in sending the historical data, the historical event processing data source system 106 may send one or more of historical time information (e.g., times of sale), historical pricing information, risk scoring information (e.g., a risk or volatility of the pricing/timing information representative of a likelihood of a recommended sale price occurring at a particular recommended sale time), customer preference information, client holdings, fee information, and/or other information.

At step 205, the intelligent decentralized delisting platform 102 may receive the historical data sent at step 204. For example, the intelligent decentralized delisting platform 102 may receive the historical data via the communication interface 113 and while the first wireless data connection is established.

At step 206, the intelligent decentralized delisting platform 102 may train a delisting recommendation engine using the historical data received at step 205. For example, the intelligent decentralized delisting platform 102 may input historical sale prices, risk information, volatility information, time information, and/or other information into a database that may be used to provide recommended sale times and/or prices for a particular asset (e.g., a delisted stock) based on historical information associated with other similar delisted stocks. For example, the intelligent decentralized delisting platform 102 may identify similarities between a particular delisted stock/current market conditions and other, previously sold, delisted stocks/corresponding historical market conditions. For example, an example model may include the following equation: recommended sale price=a*(b/c)*d, where a is the most recent sale price for the delisted stock, b is a benchmark value of current market conditions, c is a benchmark value of historical market conditions, and d is a risk factor corresponding to the stock. Additionally, the model may be trained to identify a time at which a seller is most likely to achieve the recommended sale price. For example, the model may factor in a growth or fall rate of the delisted stock based on the historical price information (e.g., compute a slope of the price trend graph), and/or market conditions (e.g., is a spike or crash imminent based on current conditions). In doing so, the intelligent decentralized delisting platform 102 may configure the delisting recommendation engine to output, based on the historical data, a recommended time to sell, a recommended sale price, and/or other information.

Figure 2B:
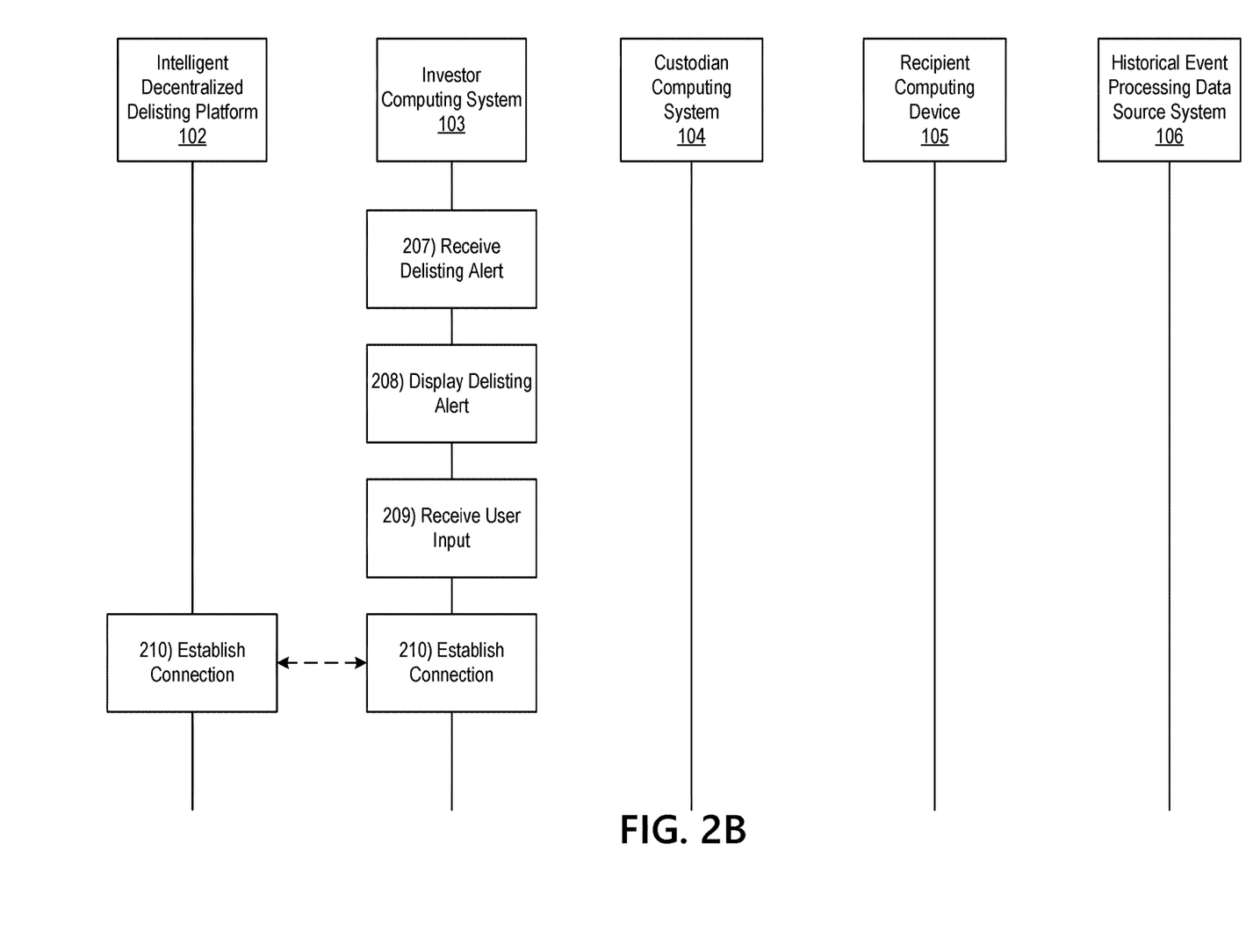

Referring to FIG. 2B, at step 207, the investor computing system 103 may receive a delisting alert. For example, the investor computing system 103 may receive an alert (e.g., from a broker or other enterprise) indicating that an asset, owned by a user of the investor computing system 103 (e.g., a stock) is delisted.

At step 208, the investor computing system 103 may display the delisting alert received at step 207. For example, the investor computing system 103 may display an alert indicating that a particular stock is delisted. In some instances, in displaying the delisting alert, the investor computing system 103 may prompt the user to identify whether or not they would like to sell the delisted stock.

At step 209, the investor computing system 103 may receive user input (e.g., via the delisting alert or another user interface) requesting a recommended action (e.g., recommended sale parameters) for the delisted stock. For example, the investor computing system 103 may receive user input requesting a recommended sale price, a recommended time of sale, and/or other information corresponding to the delisted stock.

At step 210, the investor computing system 103 may establish a connection with the intelligent decentralized delisting platform 102. For example, the investor computing system 103 may establish a first wireless data connection with the intelligent decentralized delisting platform 102 to link the investor computing system 103 to the intelligent decentralized delisting platform 102 (e.g., in preparation for sending an action recommendation request). In some instances, the investor computing system 103 may identify whether or not a connection is already established with the intelligent decentralized delisting platform 102. If a connection is already established with the intelligent decentralized delisting platform 102, the investor computing system 103 might not re-establish the connection. If a connection is not yet established, the investor computing system 103 may establish the second wireless data connection as described herein.

Figure 2C:
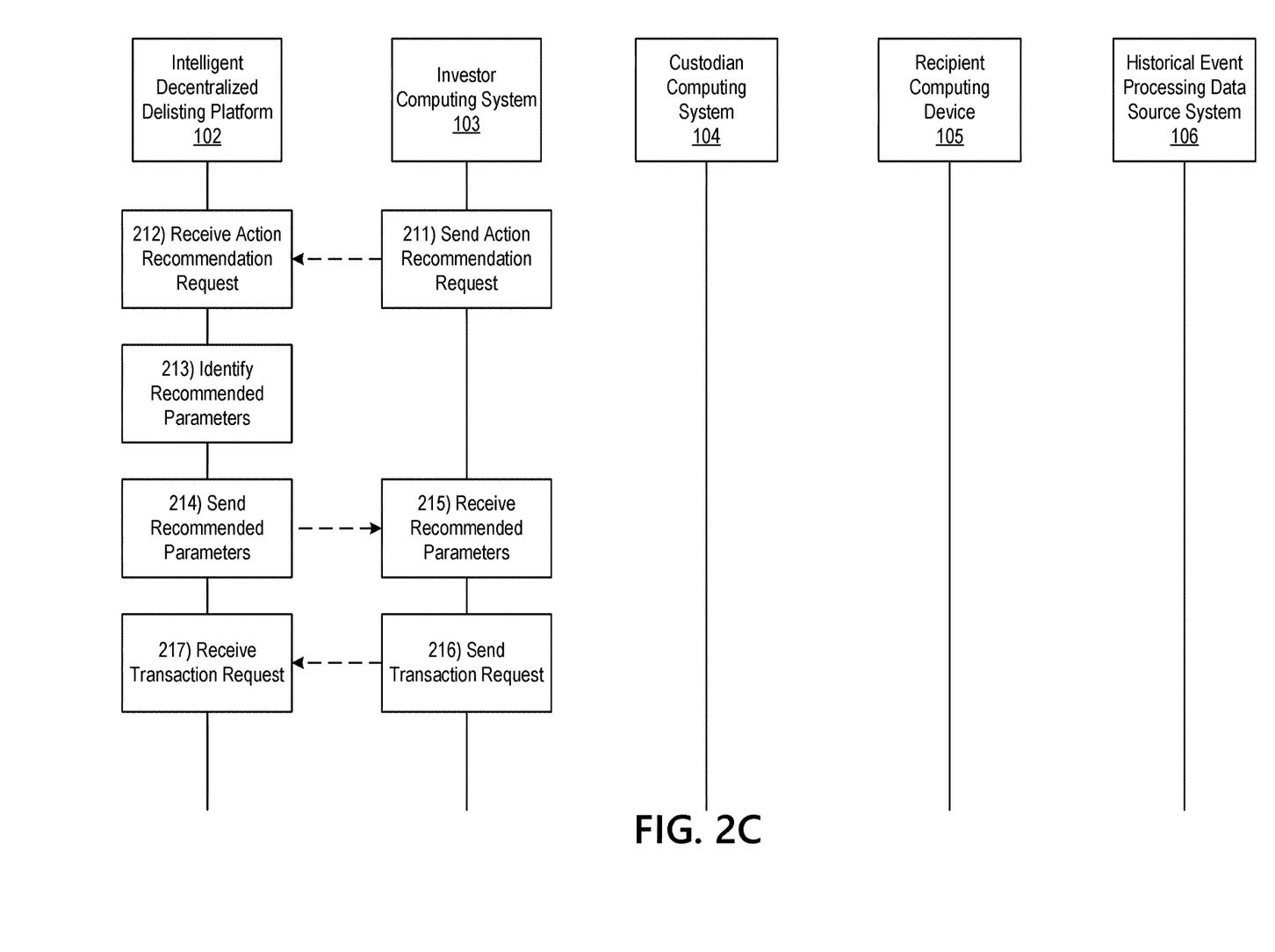

Referring to FIG. 2C, at step 211, the investor computing system 103 may send an action recommendation request to the intelligent decentralized delisting platform 102. For example, the investor computing system 103 may send a request for recommended sale parameters for the delisted stock (e.g., sale price, time of sale, and/or other information). In some instances, the investor computing system 103 may send the action recommendation request to the intelligent decentralized delisting platform 102 while the second wireless data connection is established.

At step 212, the intelligent decentralized delisting platform 102 may receive the action recommendation request sent at step 211. For example, the intelligent decentralized delisting platform 102 may receive the action recommendation request via the communication interface 113 and while the second wireless data connection is established.

At step 213, the intelligent decentralized delisting platform 102 may use the delisting recommendation engine to identify recommended parameters. For example, the intelligent decentralized delisting platform 102 may input features of the delisted stock into the delisting recommendation engine, which may use one or more artificial intelligence/machine learning techniques to identify the recommended parameters based on the historical data. For example, the intelligent decentralized delisting platform 102 may identify a recommended sale price and/or time of sale for the delisted stock. For example, the intelligent decentralized delisting platform 102 may use the delisting recommendation engine to identify, based on the historical data, a predicted time within a predetermined time window (e.g., 1 hour, 1 day, 1 week, or other time window) where a predicted sale price of the delisted stock is highest during the predetermined time window (e.g., a higher price at the predicted time than any other time during the predetermined time window).

At step 214, the intelligent decentralized delisting platform 102 may send the recommended parameters to the investor computing system 103. For example, the intelligent decentralized delisting platform 102 may send the recommended parameters to the investor computing system 103 via the communication interface 113 and while the second wireless data connection is established.

Figure 4:
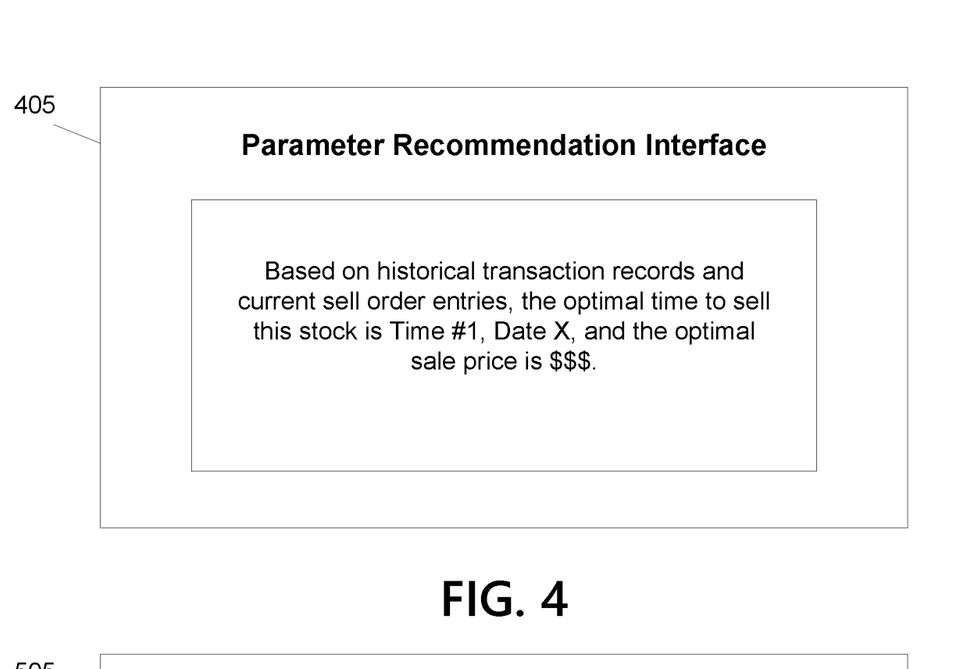
FIG. 4 and FIG. 5 depict illustrative graphical user interfaces that use a decentralized platform for Settlement of Delisted stocks in accordance with one or more example embodiments.

At step 215, the investor computing system 103 may receive the recommended parameters sent at step 214. For example, the investor computing system 103 may receive the recommended parameters while the second wireless data connection is established. In some instances, after receiving the recommended parameters, the investor computing system 103 may display the recommended parameters in a graphical user interface similar to graphical user interface 405, which is shown in FIG. 4.

At step 216, the investor computing system 103 may send a transaction request to the intelligent decentralized delisting platform 102. In some instances, in sending the transaction request, the investor computing system 103 may send a request to execute an event, transaction, sale, and/or other action based on the recommended parameters (e.g., the recommended sale price, sale time, and/or other information). In some instances, the investor computing system 103 may send a transaction request to the intelligent decentralized delisting platform 102 while the second wireless data connection is established.

At step 217, the intelligent decentralized delisting platform 102 may receive the transaction request sent at step 216. For example, the investor computing system 103 may receive the transaction request via the communication interface 113 and while the second wireless data connection is established.

Figure 2D:
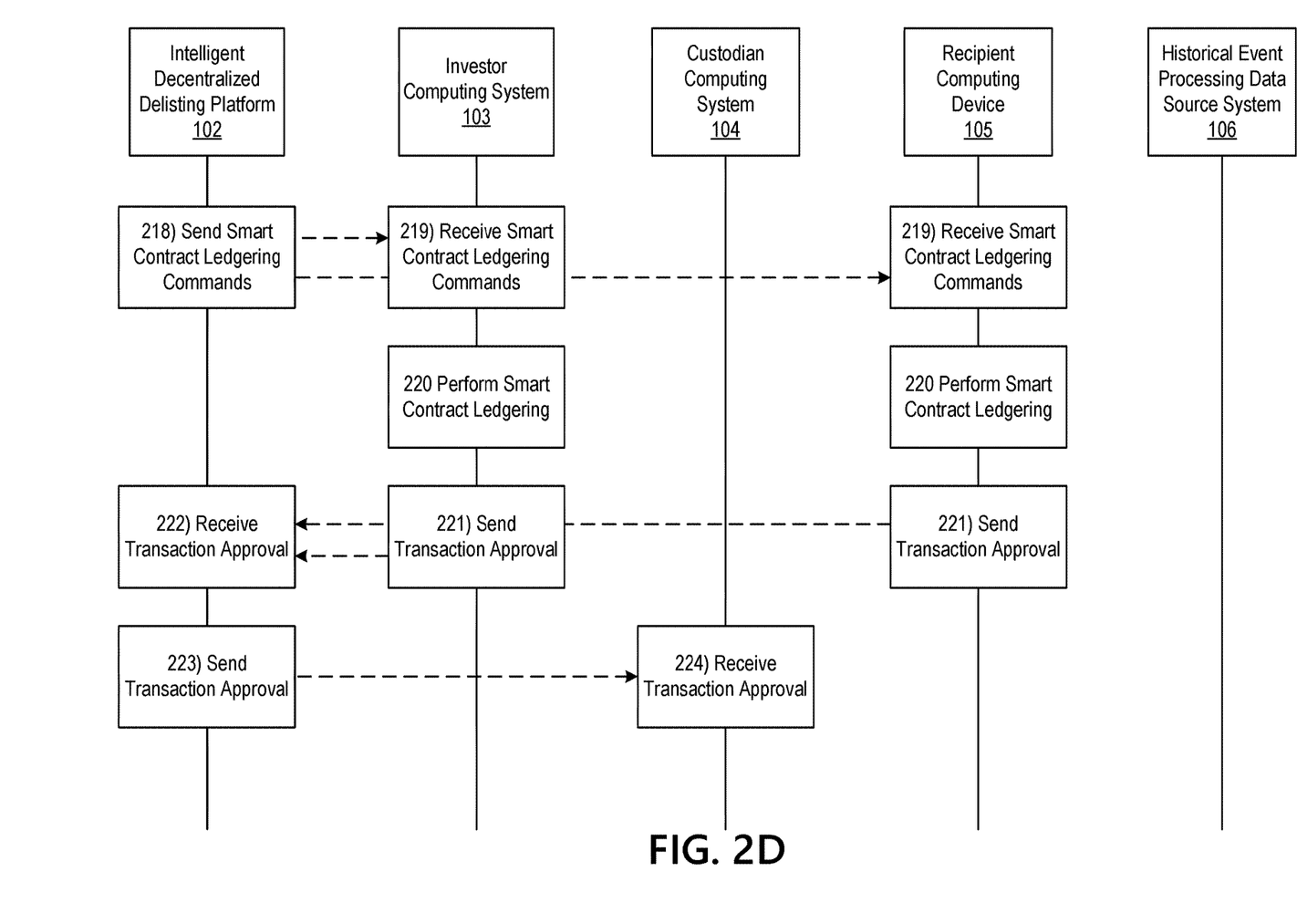

Referring to FIG. 2D, at step 218, the intelligent decentralized delisting platform 102 may send one or more commands directing the investor computing system 103 and/or the recipient computing device 105 to perform smart contract ledgering (e.g., for the purpose of settling the requested transaction, sale, event, or other action). For example, the intelligent decentralized delisting platform 102 may send the one or more commands directing the investor computing system 103 and/or the recipient computing device 105 to perform smart contract ledgering via the communication interface 113 and while a wireless data connection is established (e.g., with the investor computing system 103 and/or the recipient computing device 105).

At step 219, the investor computing system 103 and/or the recipient computing device 105 may receive the smart contract ledgering commands sent at step 218. For example, the investor computing system 103 and/or the recipient computing device 105 may receive the smart contract ledgering commands while a wireless data connection is established with the intelligent decentralized delisting platform 102.

At step 220, based on or in response to the one or more commands directing the investor computing system 103 and/or the recipient computing device 105 to perform the smart contract ledgering, the investor computing system 103 and/or the recipient computing device 105 may perform smart contract ledgering. For example, the investor computing system 103 and/or the recipient computing device 105 may write terms/parameters of the contract, approve/reject the contract, and/or otherwise interact with the contract/communicate details/revisions to the contract by writing directly to a distributed ledger (e.g., a blockchain) hosted by the intelligent decentralized delisting platform 102. For example, the investor computing system 103 may write a sale price and other proposed contract terms to a node of the distributed ledger, and the recipient computing device 105 may write an acceptance of the terms to a subsequent node of the distributed ledger (which may, e.g., include a hash of the previous node). In some instances, in writing to the distributed ledger, the investor computing system 103 and/or the recipient computing device 105 may write to one or more holochain nodes, which may, for example, be hosted by the intelligent decentralized delisting platform 102, or otherwise hosted by or among the investor computing system 103, custodian computing system 104, the recipient computing device 105, and/or other computing devices/systems. For example, software configured to provide a service/access may be stored on these devices. In some instances, the investor computing system 103 and the recipient computing device 105 may each have a corresponding/independent distributed ledger, and may be configured to write information to these nodes (e.g., on behalf of the corresponding entity (buyer, seller, custodian, and/or other entities)) accordingly. In such instances, the holochain nodes distributed across the above described computing systems may be configured in a decentralized manner, configured to process entries in real time, configured to operate offline, and/or otherwise configured using a subscription based contract. By configuring the nodes in this way, additional holochain nodes may be implemented or otherwise deployed without affecting configuration of the holochain nodes. In some instances, in performing the smart contract ledgering, the investor computing system 103 and/or the recipient computing device 105 may implement a subscription based contract, a multi-signature contract (e.g., between holochain nodes), and/or other contract.

At step 221, the investor computing system 103 and/or the recipient computing device 105 may send transaction approval information to the intelligent decentralized delisting platform 102. For example, in sending the transaction approval information, the investor computing system 103 may send information indicating that smart contract ledgering is complete and that final sale parameters have been identified. In some instances, the investor computing system 103 and the recipient computing device 105 may write the transaction approval information to the holochain (e.g., to one or more holochain nodes hosted by the intelligent decentralized delisting platform 102, the investor computing system 103, the custodian computing system 104, the recipient computing device 105, and/or other system).

At step 222, the intelligent decentralized delisting platform 102 may receive the transaction approval information from the investor computing system 103 and/or the recipient computing device 105 (e.g., via the communication interface 113 and while wireless data connections are established between the devices). In some instances, the transaction approval information may be written to the holochain as described above (e.g., to one or more holochain nodes hosted by the intelligent decentralized delisting platform 102, the investor computing system 103, the custodian computing system 104, the recipient computing device 105, and/or other system).

At step 223, the intelligent decentralized delisting platform 102 may send a transaction approval notification to the custodian computing system 104 (e.g., via the communication interface 113 and while a wireless data connection is established). At step 224, the custodian computing system 104 may receive the transaction approval notification (e.g., while a wireless data connection is established). In some instances, rather than the sending/receiving of the transaction approval notification described in steps 223-224, the custodian computing system 104 may access the holochain to identify that approval has been provided to execute the transaction, process the event, or otherwise perform an action (e.g., during the process of smart contract ledgering).

Figure 2E:
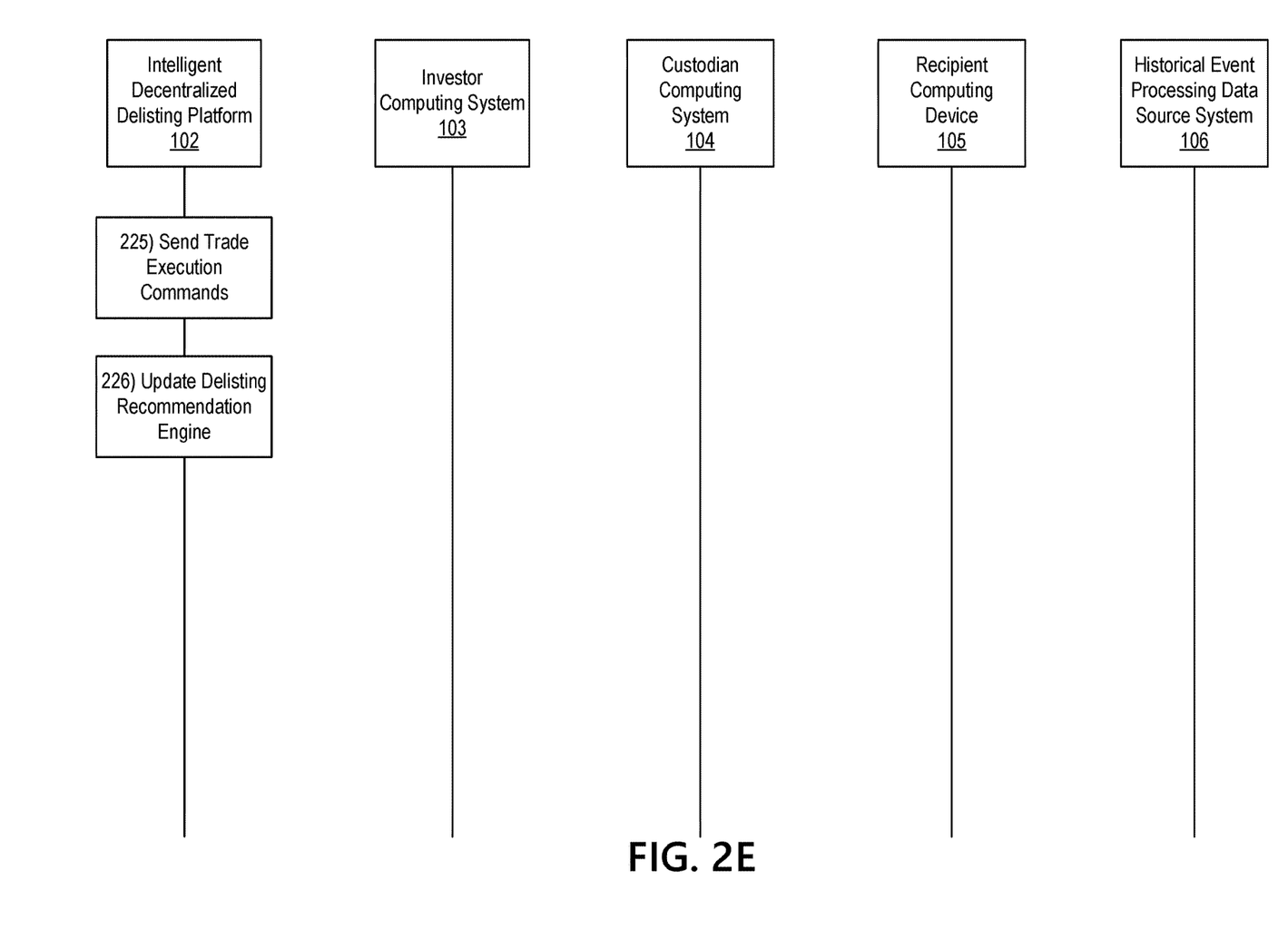
Figure 5:
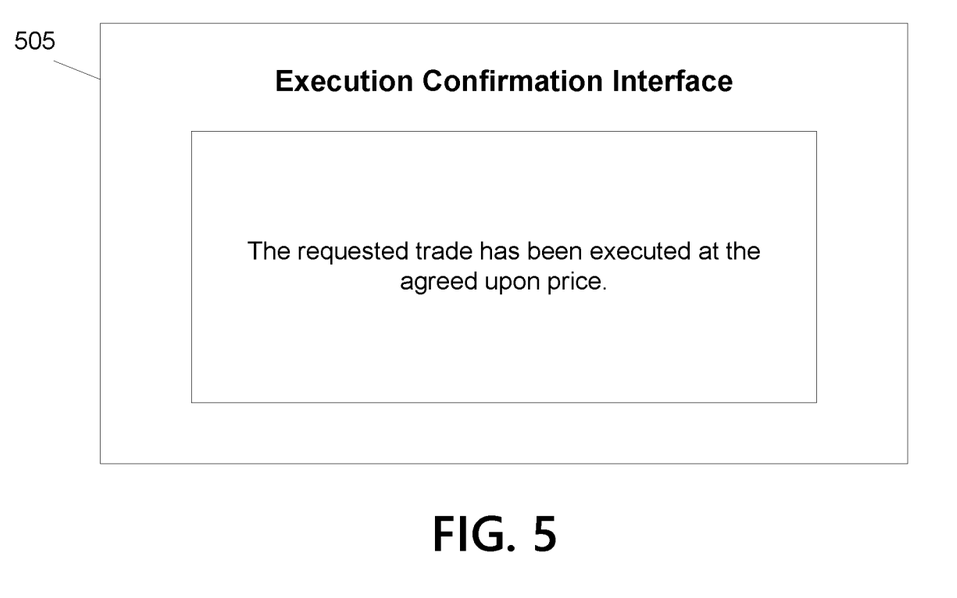

Referring to FIG. 2E, at step 225, after identifying that approval has been provided to execute the action, event, trade, transaction, or to otherwise perform another function, the intelligent decentralized delisting platform 102 may send one or more commands directing a service (e.g., such as a trade execution service) to execute the trade. Based on or in response to receiving such commands, the trade execution service may execute the trade/transaction. For example, the trade execution service may cause the delisted stock or other asset to be transferred from a seller to a buyer. In some instances, the intelligent decentralized delisting platform 102 may send the one or more trade execution commands to the investor computing system 103, custodian computing system 104, or the recipient computing device 105, which may cause the investor computing system 103, the custodian computing system 104, and/or the recipient computing device 105 to execute the trade or transaction (e.g., transfer the delisted stock form the seller to the buyer and transfer the funds from the buyer to the seller). In some instances, once the trade/transaction has been completed and settlement has been performed, the parties (e.g., the investor computing system 103 and the recipient computing device 105) may be notified. For example, the investor computing system 103 and/or the recipient computing device 105 may display a graphical user interface similar to graphical user interface 505, which is shown in FIG. 5. In these instances, the respective computing devices may record the settlement information (e.g., sale price, number of shares sold, and/or other information) in their respective holochain ledgers/nodes. In some instances, such holochain ledgers (or a portion of the included records) may subsequently be visible to the respective parties. For example, investor computing system 103 and/or recipient computing devices may be configured to display graphical user interfaces that include such records.

At step 226, the intelligent decentralized delisting platform 102 may update the delisting recommendation engine based on whether or not the recommended parameters (e.g., sale price, transaction time, and/or other parameters) were accepted by the seller. For example, the intelligent decentralized delisting platform 102 may reinforce the existing model if the recommended parameters were accepted. Otherwise, if the recommended parameters were not accepted, the intelligent decentralized delisting platform 102 may iteratively refine/update the model to incorporate this information. In doing so, the intelligent decentralized delisting platform 102 may continually improve the accuracy of the model.

Although the above described systems and methods primarily refer to delisted stock trading/transactions, such systems and methods may be used to sell or otherwise dispose of other assets without departing from the scope of this disclosure.

Figure 3:
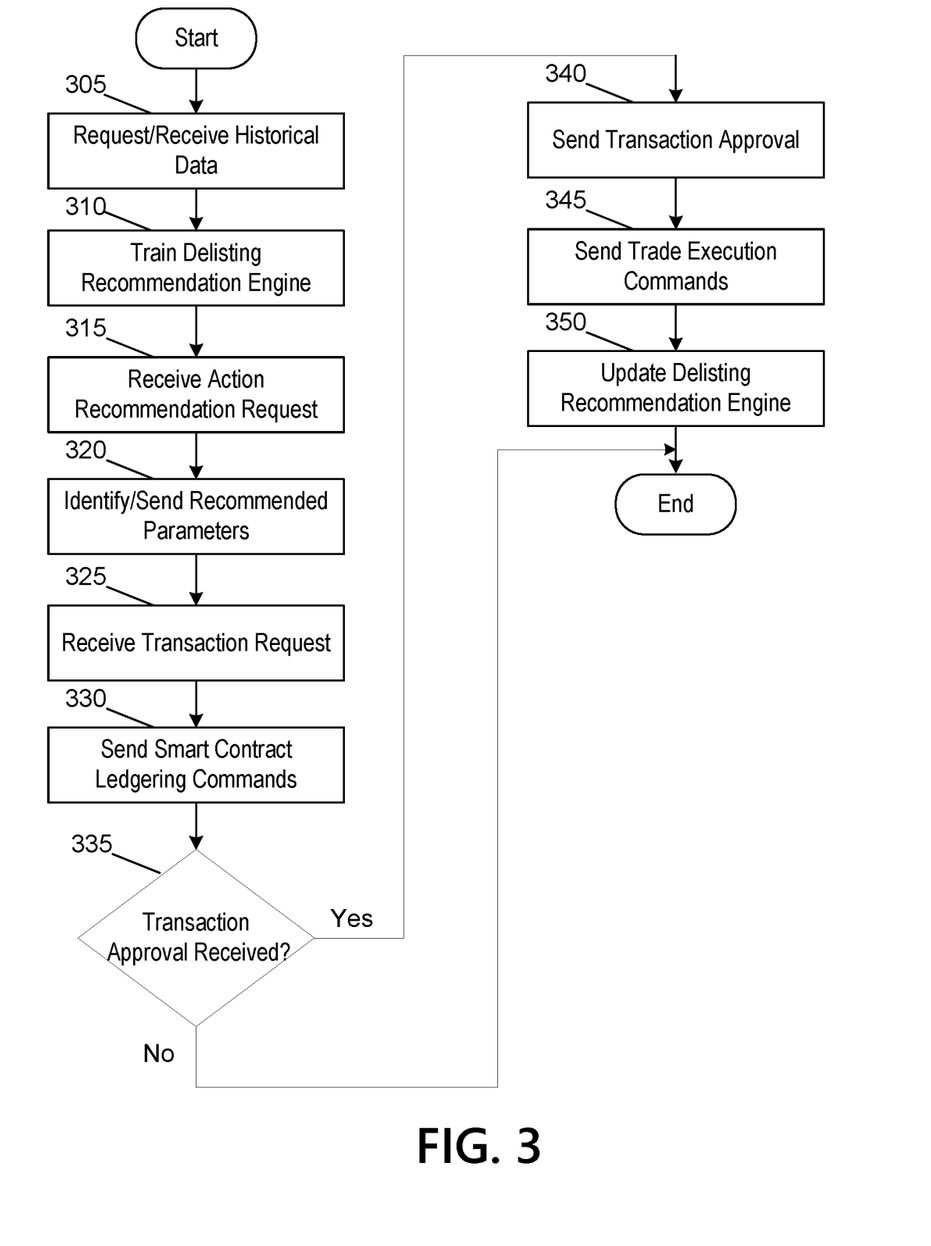
FIG. 3 depicts an illustrative method that uses artificial intelligence to settle delisted stocks in accordance with one or more example embodiments.

FIG. 3 depicts an illustrative method that uses artificial intelligence to settle delisted stocks in accordance with one or more example embodiments. Referring to FIG. 3, at step 305, a computing platform having at least one processor, a communication interface, and memory may request and receive historical data. At step 310, the computing platform may train a delisting recommendation engine using the historical data. At step 315, the computing platform may receive an action recommendation request. At step 320, the computing platform may identify and send recommended parameters. At step 325, the computing platform may receive a transaction request based on the recommended parameters. At step 330, the computing platform may send one or more smart contract ledgering commands. At step 335, the computing platform may identify whether or not transaction approval is received. If transaction approval is not received, the method may end. If transaction approval is received, the computing platform may proceed to step 340.

At step 340, the computing platform may send a transaction approval notification. At step 345, the computing platform may send one or more trade execution commands. At step 350, the computing platform may update the delisting recommendation engine.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform for intelligent, real time execution of delisted stock transactions comprising:
   at least one processor;
   a communication interface communicatively coupled to the at least one processor; and
   memory storing computer-readable instructions that, when executed by the at least one processor, cause the computing platform to:
      identify, using a delisting recommendation engine, recommended parameters for a sale of a first delisted stock, wherein the recommended parameters include at least: a recommended time to sell and a recommended sale price, and wherein identifying the recommended sale price comprises executing the following equation: $a*(b/c)*d$, wherein a is a most recent sale price for the first delisted stock, b is a benchmark value of current market conditions, c is a benchmark value of historical market conditions, and d is a risk factor corresponding to the first delisted stock;

send, to a client computing device, the recommended parameters identified using the delisting recommendation engine;

receive a request to sell the first delisted stock under conditions of the recommended parameters identified using the delisting recommendation engine;

send, to the client computing device and a recipient computing device, one or more commands that cause execution of smart contract ledgering between a buyer and a seller to identify final sale parameters, wherein sending the one or more commands that cause execution of smart contract ledgering between the buyer and the seller causes the client computing device and the recipient computing device to execute smart contract ledgering between the buyer and the seller to identify the final sale parameters, and wherein:

execution of the smart contract ledgering comprises implementing one or more distributed ledger nodes, and each of the one or more distributed ledger nodes is configured to maintain an independent distributed ledger for an entity associated with the corresponding distributed ledger node, wherein the one or more distributed ledger nodes comprise holochain nodes, configured:
in a decentralized manner,
to process entries in real time, and
to operate offline;

receive an indication that the smart contract ledgering is completed and that the final sale parameters have been identified;

send, to a custodian computing device and the client computing device, one or more commands that cause execution of a transfer of the first delisted stock from the seller to the buyer and a transfer of funds from the buyer to the seller, wherein sending the one or more commands that cause execution of the transfer of the first delisted stock from the seller to the buyer and the transfer of the funds from the buyer to the seller causes execution of the transfer of the first delisted stock from the seller to the buyer and the transfer of the funds from the buyer to the seller; and dynamically update, based on acceptance of the recommended parameters by the seller, the delisting recommendation engine, wherein the update improves accuracy of the delisting recommendation engine.

2. The computing platform of claim 1, wherein the memory stores additional computer-readable instructions that, when executed by the at least one processor, cause the computing platform to:

train, based on historical data, the delisting recommendation engine, wherein training the delisting recommendation engine configures the delisting recommendation engine to output, based on the historical data, the recommended time to sell and the recommended sale price for one or more delisted stocks.

3. The computing platform of claim 2, wherein identifying the recommended parameters comprises identifying, based on the historical data, a predicted time within a predetermined time window in which a predicted sale price of the first delisted stock is higher than at any other time during the predetermined time window.

4. The computing platform of claim 2, wherein the historical data comprises one or more of: risk scoring information, pricing information, or time information.

5. The computing platform of claim 4, wherein the risk scoring information identifies a likelihood of the recommended sale price occurring at the recommended time to sell.

6. The computing platform of claim 1, wherein the holochain nodes are configured using a subscription based contract.

7. The computing platform of claim 1, wherein execution of the smart contract ledgering comprises executing a multi-signature contract between each of the holochain nodes.

8. The computing platform of claim 1, wherein additional holochain nodes may be added to the computing platform without affecting configuration of the holochain nodes.

9. The computing platform of claim 1, wherein the memory stores additional computer-readable instructions that, when executed by the at least one processor, cause the computing platform to:

receive, from the client computing device, a request to provide the recommended parameters for the sale of the first delisted stock.

10. A method for intelligent, real time execution of delisted stock transactions comprising:

at a computing platform comprising at least one processor, a communication interface, and memory:

identifying, using a delisting recommendation engine, recommended parameters for a sale of a first delisted stock, wherein the recommended parameters include at least: a recommended time to sell and a recommended sale price, and wherein identifying the recommended sale price comprises executing the following equation: $a*(b/c)*d$, wherein a is a most recent sale price for the first delisted stock, b is a benchmark value of current market conditions, c is a benchmark value of historical market conditions, and d is a risk factor corresponding to the first delisted stock;

sending, to a client computing device, the recommended parameters identified using the delisting recommendation engine;

receiving a request to sell the first delisted stock under conditions of the recommended parameters identified using the delisting recommendation engine;

sending, to the client computing device and a recipient computing device, one or more commands that cause execution of smart contract ledgering between a buyer and a seller to identify final sale parameters, wherein sending the one or more commands that cause execution of smart contract ledgering between the buyer and the seller causes the client computing device and the recipient computing device to execute smart contract ledgering between the buyer and the seller to identify the final sale parameters, and wherein:

execution of the smart contract ledgering comprises implementing one or more distributed ledger nodes, and each of the one or more distributed ledger nodes is configured to maintain an independent distributed ledger for an entity associated with the corresponding distributed ledger node, wherein the one or more distributed ledger nodes comprise holochain nodes, configured:

in a decentralized manner,
to process entries in real time, and
to operate offline;
receiving an indication that the smart contract ledgering is completed and that the final sale parameters have been identified;
sending, to a custodian computing device and the client computing device, one or more commands that cause execution of a transfer of the first delisted stock from the seller to the buyer and a transfer of funds from the buyer to the seller, wherein sending the one or more commands that cause execution of the transfer of the first delisted stock from the seller to the buyer and the transfer of the funds from the buyer to the seller causes execution of the transfer of the first delisted stock from the seller to the buyer and the transfer of the funds from the buyer to the seller; and
dynamically update, based on acceptance of the recommended parameters by the seller, the delisting recommendation engine, wherein the update improves accuracy of the delisting recommendation engine.

11. The method of claim 10, further comprising training, based on historical data, the delisting recommendation engine, wherein training the delisting recommendation engine configures the delisting recommendation engine to output, based on the historical data, the recommended time to sell and the recommended sale price for one or more delisted stocks.

12. The method of claim 11, wherein identifying the recommended parameters comprises identifying, based on the historical data, a predicted time within a predetermined time window in which a predicted sale price of the first delisted stock is higher than at any other time during the predetermined time window.

13. The method of claim 11, wherein the historical data comprises one or more of: risk scoring information, pricing information, or time information.

14. The method of claim 13, wherein the risk scoring information identifies a likelihood of the recommended sale price occurring at the recommended time to sell.

15. The method of claim 10, wherein the holochain nodes are configured using a subscription-based contract.

16. The method of claim 10, wherein execution of the smart contract ledgering comprises executing a multi-signature contract between each of the holochain nodes.

17. The method of claim 10, further comprising:
receiving, from the client computing device, a request to provide the recommended parameters for the sale of the first delisted stock.

18. One or more non-transitory computer-readable media storing instructions that, when executed by a computing platform, for intelligent, real time execution of delisted stock transactions, comprising at least one processor, a communication interface, and memory, cause the computing platform to:
identify, using a delisting recommendation engine, recommended parameters for a sale of a first delisted stock, wherein the recommended parameters include at least: a recommended time to sell and a recommended sale price, and wherein identifying the recommended sale price comprises executing the following equation: a*(b/c)*d, wherein a is a most recent sale price for the first delisted stock, b is a benchmark value of current market conditions, c is a benchmark value of historical market conditions, and d is a risk factor corresponding to the first delisted stock;
send, to a client computing device, the recommended parameters identified using the delisting recommendation engine;
receive a request to sell the first delisted stock under conditions of the recommended parameters identified using the delisting recommendation engine;
send, to the client computing device and a recipient computing device, one or more commands that cause execution of smart contract ledgering between a buyer and a seller to identify final sale parameters, wherein sending the one or more commands that cause execution of smart contract ledgering between the buyer and the seller causes the client computing device and the recipient computing device to execute smart contract ledgering between the buyer and the seller to identify the final sale parameters, and wherein:
execution of the smart contract ledgering comprises implementing one or more distributed ledger nodes, and
each of the one or more distributed ledger nodes is configured to maintain an independent distributed ledger for an entity associated with the corresponding distributed ledger node, wherein the one or more distributed ledger nodes comprise holochain nodes, configured:
in a decentralized manner,
to process entries in real time, and
to operate offline;
receive an indication that the smart contract ledgering is completed and that the final sale parameters have been identified;
send, to a custodian computing device and the client computing device, one or more commands that cause execution of a transfer of the first delisted stock from the seller to the buyer and a transfer of funds from the buyer to the seller, wherein sending the one or more commands that cause execution of the transfer of the first delisted stock from the seller to the buyer and the transfer of the funds from the buyer to the seller causes execution of the transfer of the first delisted stock from the seller to the buyer and the transfer of the funds from the buyer to the seller; and
dynamically update, based on acceptance of the recommended parameters by the seller, the delisting recommendation engine, wherein the update improves accuracy of the delisting recommendation engine.

19. The one or more non-transitory computer-readable media of claim 18, wherein the memory stores additional computer-readable instructions that, when executed by the at least one processor, cause the computing platform to:
train, based on historical data, the delisting recommendation engine, wherein training the delisting recommendation engine configures the delisting recommendation engine to output, based on the historical data, the recommended time to sell and the recommended sale price for one or more delisted stocks.

20. The one or more non-transitory computer-readable media of claim 19, wherein identifying the recommended parameters comprises identifying, based on the historical data, a predicted time within a predetermined time window in which a predicted sale price of the first delisted stock is higher than at any other time during the predetermined time window.

* * * * *